US009055003B2

(12) United States Patent
Baratakke et al.

(10) Patent No.: US 9,055,003 B2
(45) Date of Patent: Jun. 9, 2015

(54) REGULATING NETWORK BANDWIDTH IN A VIRTUALIZED ENVIRONMENT

(75) Inventors: Kavitha Vittal Murthy Baratakke, Round Rock, TX (US); Adekunle Bello, Pflugerville, TX (US); Nikhil Hegde, Round Rock, TX (US); Rashmi Narasimhan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 13/039,908

(22) Filed: Mar. 3, 2011

(65) Prior Publication Data

US 2012/0226800 A1    Sep. 6, 2012

(51) Int. Cl.
*G06F 15/173*        (2006.01)
*H04L 12/931*        (2013.01)
*H04L 12/825*        (2013.01)

(52) U.S. Cl.
CPC .............. *H04L 49/70* (2013.01); *Y02B 60/31* (2013.01); *H04L 47/266* (2013.01); *H04L 49/501* (2013.01)

(58) Field of Classification Search
CPC ..... H04L 49/70; H04L 47/266; H04L 49/501; Y02B 60/31
USPC ......................................... 709/224, 203, 226
See application file for complete search history.

(56) References Cited

U.S. PATENT DOCUMENTS

| 5,953,338 | A   | * | 9/1999  | Ma et al. ................ 370/395.21 |
| 7,260,820 | B1  | * | 8/2007  | Waldspurger et al. ............ 718/1 |
| 7,453,804 | B1  |   | 11/2008 | Feroz et al.                         |
| 7,778,275 | B2  |   | 8/2010  | Mani et al.                          |
| 8,341,624 | B1  | * | 12/2012 | Hobbs ............................ 718/1 |
| 2008/0285551 | A1 |  | 11/2008 | Ashok et al.                         |
| 2009/0055831 | A1 |  | 2/2009  | Bauman et al.                        |
| 2009/0164994 | A1 | * | 6/2009  | Vasilevsky et al. ............... 718/1 |
| 2012/0127857 | A1 | * | 5/2012  | Sundar et al. ............... 370/230.1 |

FOREIGN PATENT DOCUMENTS

WO    WO 0120876  A1 *  3/2001

* cited by examiner

*Primary Examiner* — Jude Jean Gilles
*Assistant Examiner* — Jaren M Means
(74) *Attorney, Agent, or Firm* — Nicholas L. Cadmus; Mark Vallone; Edward A. Gecovich

(57) ABSTRACT

In a method for regulating network bandwidth in a virtualized computer environment, a computer having a hypervisor program receives a request from a first virtual client to transmit data. In response, the computer transfers the data from a memory of the first virtual client to a memory of a virtual server. The computer receives an error notification from a shared virtual network adapter of the virtual server, indicative of insufficient network bandwidth available to transmit the data. In response, the computer notifies the first virtual client that insufficient network bandwidth is available to transmit the data.

16 Claims, 7 Drawing Sheets

REGULATING NETWORK BANDWIDTH IN A VIRTUALIZED ENVIRONMENT

BACKGROUND

The present invention relates generally to virtualized computers and more specifically to managing network bandwidth in a virtualized computer.

System virtualization creates several virtual computers within a single physical computer. Each virtual computer is a logical division or sharing of physical resources, such as a percentage of real processor capacity, an amount of real memory, an amount of storage and a percentage of network I/O capacity. While a specific real processor can in some cases be allocated to a virtual computer, the virtual computer is not a self-contained computer containing the real processor, but is formed with other virtual computers from the same real computer. Virtualization of resources can also be implemented by combining multiple physical resources into shared pools from which virtual resources may be shared by multiple entities. In some computer platforms virtualization is implemented by logical partitions (LPARs) of physical resources.

FIG. 1 illustrates a known real computer 116. Real computer 116 includes multiple LPARs 103a-d. A Virtual I/O Client (VIOC) computer and a Virtual I/O Server (VIOS) computer can be formed in separate LPARs in the same or different real computers by installation of I/O client software and I/O server software in the respective LPARs. In the example illustrated in FIG. 1, VIOCs 104a-c are formed in respective LPARs 103a-c in real computer 116, and a VIOS 104d is formed in LPAR 103d in the same real computer 116. VIOCs 104a-c have virtual Ethernet adapters 106a-c for communicating with one another and with VIOS 104d. VIOS 104d provides virtualized network resources to VIOCs 104a-c via shared Ethernet adapter (SEA) 108. SEA 108 bridges physical Ethernet adapter 110 with virtual Ethernet adapters 106a-c. Physical Ethernet adapter 110 connects real computer 116 to external network 120 via physical switch 122. A hypervisor program 112 forms LPARs 103a-d from real resources of real computer 116, performs standard operating system functions, and manages the communication between LPARs 103a-d via virtual switch 114. LPARs 103a-d are each mapped to, or allocated, a portion of memory in real RAM (not shown). Hypervisor program 112 also manages the Remote Direct Data Access (RDMA) program 118 for copying packets from mapped memory at VIOCs 104a-c to mapped memory at VIOS 104d when VIOS 104d receives a request from any of VIOCs 104a-c to transmit packets to external network 120.

SEA 108 of VIOS 104d apportions network bandwidth in a previously known manner when VIOS 104d receives requests to transmit packets from any of VIOCs 104a-c. The network bandwidth is provided by internal hardware and software components (such as input buffers to SEA 108 and physical network adapter card 110) within computer 116 as well as external hardware and software components (such as routers, switches, etc.) in the network communication path used by and external to computer 116 as well as other network communication resources.

SEA 108 may give higher priority to certain types of packets than others depending on various factors such as a quality of service commitment to a sender or recipient of the data transfer. Occasionally, when network bandwidth is fully consumed, and SEA 108 cannot transmit a packet, SEA 108 will drop the packet. In such a case, the sending VIOC, e.g., VIOC 104c, will not receive an acknowledgement for the packet. Likewise, the sending VIOC will not receive an acknowledgement in those cases where the packet is dropped for reasons other than saturated network bandwidth (i.e. faulty packet.) The sending VIOC will not know the reason why SEA 108 dropped the packet, and will re-transmit the request to transmit the packet after a time-out. In the former case of network bandwidth overload, SEA 108 will likely not be able to re-transmit the packet and will likely again drop the packet, because typically network bandwidth overload takes longer to resolve than the time-out. (The time-out is typically set to outlast other causes of a dropped packet which are typically resolved in less time than a network bandwidth overload.) Consequently, the sending VIOC will continue to re-transmit requests to transmit the packet to VIOS 104d without being aware that network bandwidth remains unavailable, and this compounds the bandwidth utilization problem. SEA 108 is not capable of notifying the sending VIOC when network bandwidth becomes available.

SUMMARY

The present invention resides in a method, computer program product, and a computer system for regulating network bandwidth in a virtualized computer environment.

In a first embodiment of the present invention, a computer having a hypervisor program receives a request from a first virtual client to transmit data. In response, the computer copies the data from a memory of the first virtual client to a memory of a virtual server. The computer receives an error notification from a shared virtual network adapter of the virtual server, indicative of insufficient network bandwidth available to transmit the data. In response, the computer notifies the first virtual client that insufficient network bandwidth is available to transmit the data.

In a second embodiment of the present invention, a computer program product has first program instructions to receive a request to transmit data from a first virtual client to a virtual server. The computer program product has second program instructions to copy the data from a memory of the first virtual client to a memory of a virtual server. The computer program product has third program instructions to receive a bandwidth utilization error notification from a shared virtual network adapter of the virtual server and in response, to notify the first virtual client of insufficient network bandwidth.

In a third embodiment of the present invention, a computer system has first program instructions to receive a request to transmit data from a first virtual client to a virtual server. The computer program product has second program instructions to copy the data from a memory of the first virtual client to a memory of a virtual server. The computer program product has third program instructions to receive a bandwidth utilization error notification from a shared virtual network adapter of the virtual server and in response, to notify the first virtual client of insufficient network bandwidth.

DETAILED DESCRIPTION

Figure 1:
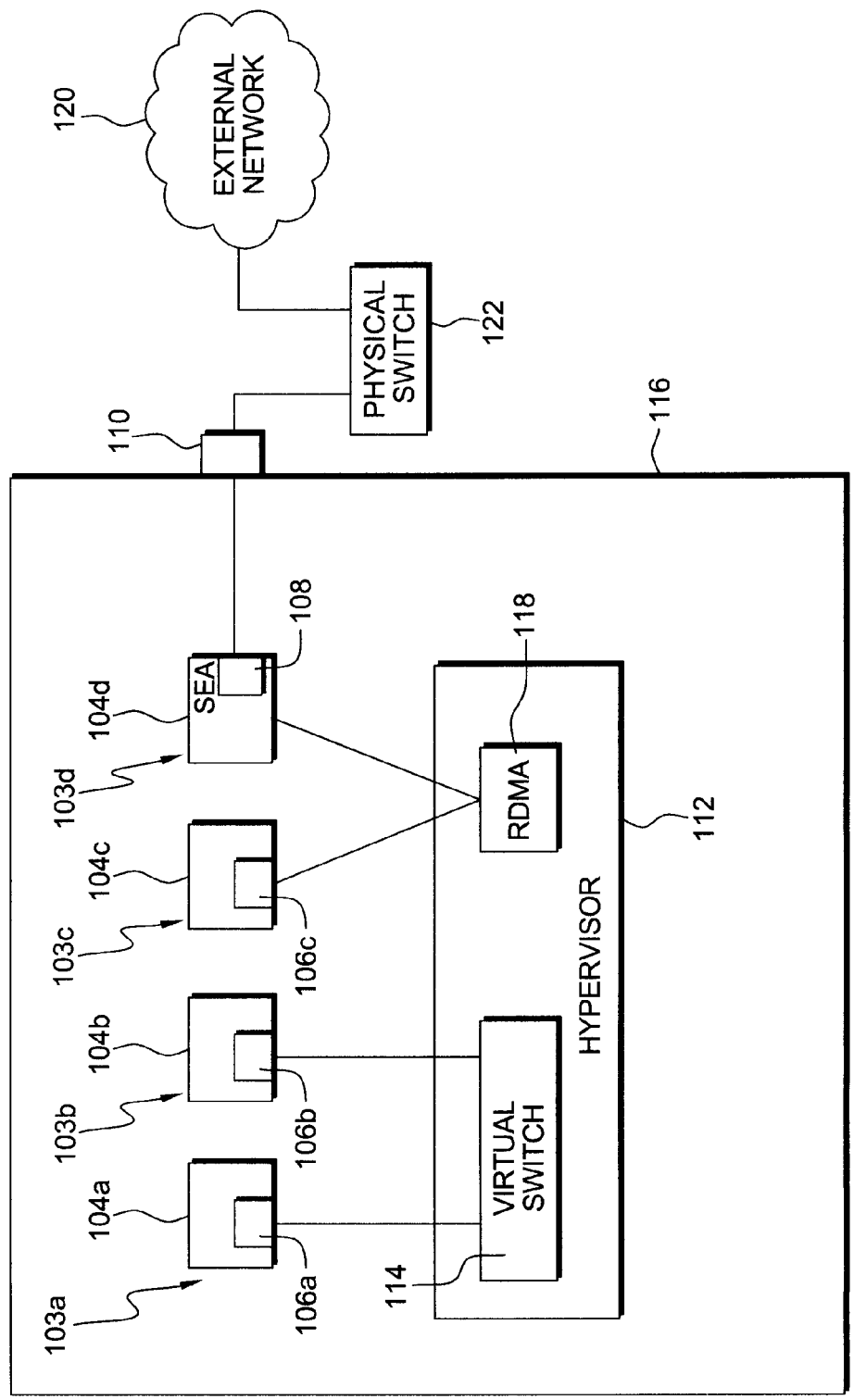
FIG. 1 illustrates a real computer according to the Prior Art.
Figure 2:
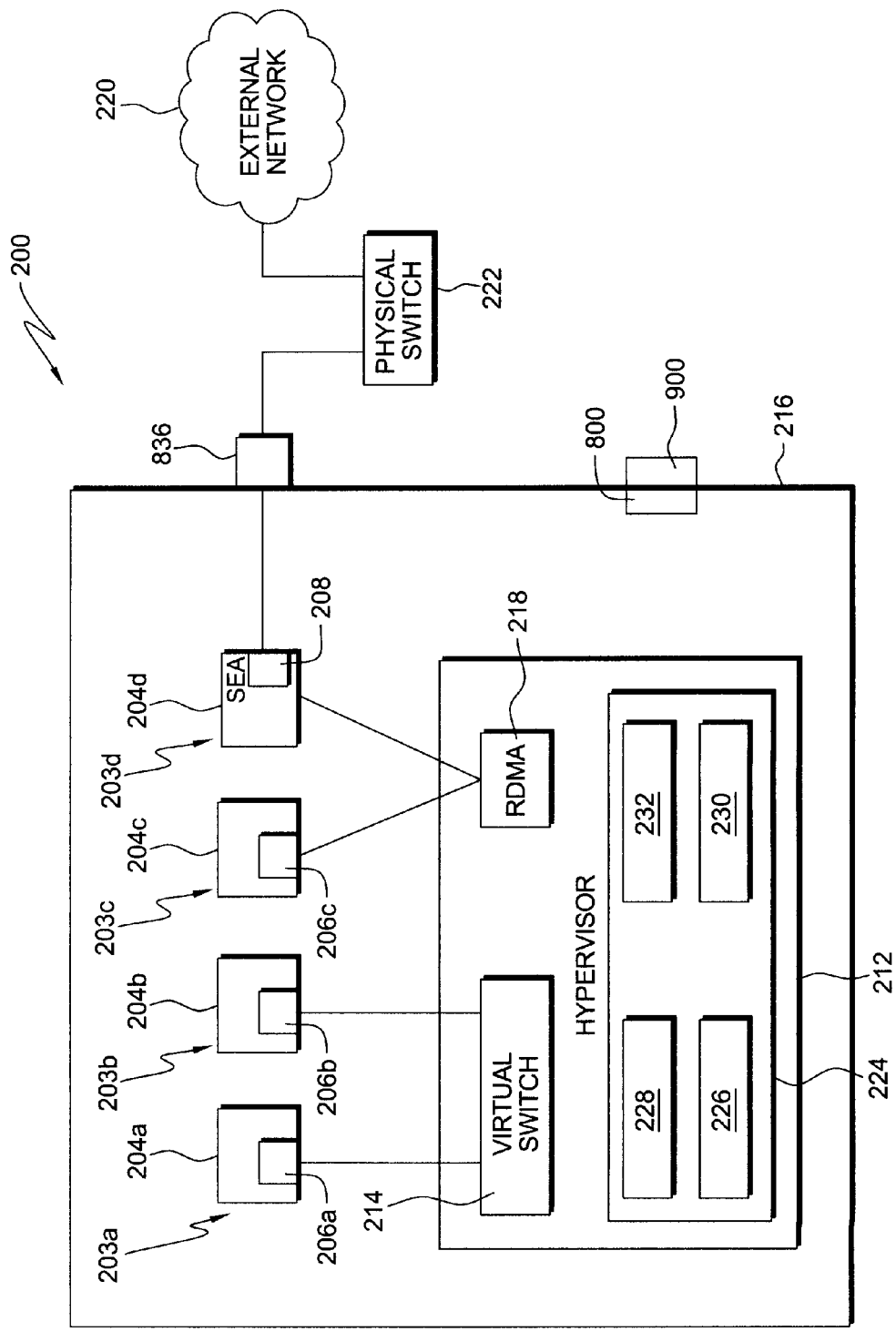
FIG. 2 illustrates a computer system for regulating network bandwidth in a virtualized computer environment, according to one embodiment of the present invention.

The present invention will now be described in detail with reference to the Figures. FIG. 2 illustrates a computer system generally 200 for regulating network bandwidth in a virtualized computer environment, according to one embodiment of the present invention. Computer system 200 includes a real computer 216 comprising internal components 800 and external components 900. Real computer 216 has been divided into multiple logical partitions (LPARs) 203a,b,c,d. In the illustrated example, Virtual I/O Clients (VIOCs) 204a,b,c are formed in LPARs 203a,b,c by installation of I/O client programs in respective LPARs 203a,b,c, and Virtual I/O Server (VIOS) 204d is formed in LPAR 203d by installation of an I/O server program in LPAR 203d. Each of the I/O client programs enables I/O traffic for TCP/IP data to be routed through VIOS 204d, and the I/O server program bridges TCP/IP data from VIOCs 204a,b,c to external network 220. In other embodiments, there can be a different number of LPARs in real computer 216, each formed into a VIOC or a VIOS. VIOCs 204a-c include respective virtual Ethernet adapters 206a-c for communicating with one another and with VIOS 204d via shared Ethernet adapter (SEA) 208. SEA 208 also interfaces to physical Ethernet adapter 836. Ethernet adapter 836 connects real computer 216 and VIOS 204d to external real network 220 via physical switch 222.

The overall network bandwidth affecting computer 216 is based on internal hardware and software components (such as input buffers to and processing speed of SEA 208 and physical network adapter card 836) within computer 216 as well as external hardware and software components (such as routers, switches, etc.) in the network communication path used by and external to computer 216. The present invention monitors and manages network bandwidth utilization primarily based on internal hardware and software components as described in more detail below.

A hypervisor program 212 forms the LPARs 203a,b,c,d from the real resources of real computer 216 (by logical sharing of the real processors, memory, storage and network capacity), performs standard operating system functions, and manages communications between LPARs 203a,b,c,d via virtual switch 214 and Remote Data Memory Access (RDMA) program 218. For example, when VIOC 204c wants to transmit a packet to external network 220, VIOC 204c sends a request to VIOS 204d via virtual switch 214. Hypervisor program 212 instructs RDMA program 218 to copy the packet from the memory of the sending VIOC 204c to the memory of VIOS 204d. Hypervisor program 212 includes a bandwidth regulating program 224 for regulating network bandwidth usage among LPARs 203a,b,c,d and for communicating network bandwidth status to LPARs 203a,b,c,d.

Bandwidth regulating program 224 has a notification input program function 226 for receiving notifications from SEA 208 regarding bandwidth utilization. If network bandwidth is at full capacity, and SEA 208 is not able to transmit a packet as requested by VIOC 204c because of network bandwidth overload/saturation, SEA 208 drops the packet and sends a notification to notification input program function 226 indicating saturated network bandwidth. In response, a client notification program function 228 within bandwidth regulating program 224 notifies the sending VIOC 204c of the saturated network bandwidth. Thus, VIOC 204c learns that the packet was dropped because of saturated network bandwidth in this case, and is able to distinguish this cause of dropped packet from other causes of dropped packets.

VIOC 204c is configured to wait one of a plurality of predetermined timeout intervals before attempting to re-transmit the request to transmit the packet. In accordance with one embodiment of the present invention, the duration of the predetermined timeout for each dropped packet is based in part on an expected time for the problem that results in the dropped packet to subside. More specifically, because VIOC 204c is able to distinguish when packets are dropped because of saturated network bandwidth (versus other problems), VIOC 204c is configured to wait a predetermined timeout interval of a duration during which the network bandwidth saturation is expected to alleviate, before re-transmitting the request to transmit the packet. Typically, bandwidth saturation takes longer to alleviate than faulty packet and other problems which can also result in a dropped packet, so the predetermined timeout interval for retransmitting requests to transmit packets dropped because of network bandwidth saturation is typically longer than the predetermined timeout interval for re-transmitting requests to transmit packets dropped for faulty packet and other reasons. The predetermined wait interval for each type of problem can be determined either from experience of a human network administrator, or from records made by VIOS 204d as to the average time between onset and alleviation of each type of problem which results in dropped packets.

In an alternate embodiment of the present invention, VIOC 204c does not determine when to re-transmit the request to transmit the dropped packet based on a predetermined timeout interval. Rather, notification input program function 226 continues to monitor for notifications from SEA 208. When SEA 208 determines that network bandwidth becomes available, SEA 208 sends a corresponding notification to notification input program function 226 indicating that network bandwidth is now available to transmit additional packets. Client notification program function 228 then notifies sending VIOC 204c of the available network bandwidth to transmit additional packets. In response, VIOC 204c retransmits the request to transmit the packet. Thus, in this alternate embodiment of the present invention, VIOC 204c waits to receive a network available notification from client notification program function 228 before re-transmit the request to transmit the dropped packet. This typically results in fewer re-transmissions by shared Ethernet adapters than in the known technology where requests to transmit the dropped packets are re-transmitted at predetermined intervals.

In an example embodiment, bandwidth regulating program 224 includes an allocated limit program function 230 for inspecting an incoming request to transmit a packet from VIOC 204c before RDMA program 218 copies the packet from mapped memory of the sending VIOC 204c to mapped memory of VIOS 204d. By inspecting the request, allocated limit program function 230 is able to determine how much bandwidth will be required to transmit the packet. For example, allocated limit program function 230 computes the bandwidth requirement to transmit the packet using the rate at which VIOC 204c submits requests to transmit packets and the size of these packets. Allocated limit program function 230 maintains an allocation table 232 which contains percentages of network bandwidth pre-allocated for the respective VIOCs 204a-c. Allocated limit program function 230 checks the incoming request to transmit the packet from VIOC 204c against allocation table 232 to determine if sending the packet will exceed the pre-allocated bandwidth limit of VIOC 204c. If transmitting the packet will exceed the bandwidth limit allocated to VIOC 204c, allocated limit program function 230 instructs client notification program function 228 to return an error notification, indicative of network bandwidth overload, to VIOC 204c, and notifies hypervisor program 212 of the network bandwidth overload. Hypervisor program 212 then ignores the request to transmit the data packets such that the data packets are not forwarded to VIOS 204d for transmission to the destination.

In an alternate embodiment of the present invention, allocated limit program function 230 dynamically divides the total available bandwidth between those of VIOCs 204a,b,c that are active and does not allocate any bandwidth those of VIOCs 204a,b,c that are idle. For example, if a total bandwidth of 4 gigabits per second (Gbps) is available at SEA 208, allocated limit program function 230 dynamically allocates 2 Gbps to each of VIOC 204a and VIOC 204b and no bandwidth to VIOC 204c when VIOC 204a and VIOC 204b are both active and VIOC 204c is idle. If VIOC 204b later becomes idle and VIOC 204c remains idle, allocated limit program function 230 dynamically allocates 4 Gbps to VIOC 204a and no bandwidth to VIOCs 204b-c. When hypervisor program 212 later receives a request to transmit a packet from VIOC 204b, allocated limit program function 230 dynamically adjusts the allocated limit to 2 Gbps to each of VIOC 204a and VIOC 204b and returns an error to VOIC 204a if VOIC 204a attempts to transmit at higher rates.

Figure 3:
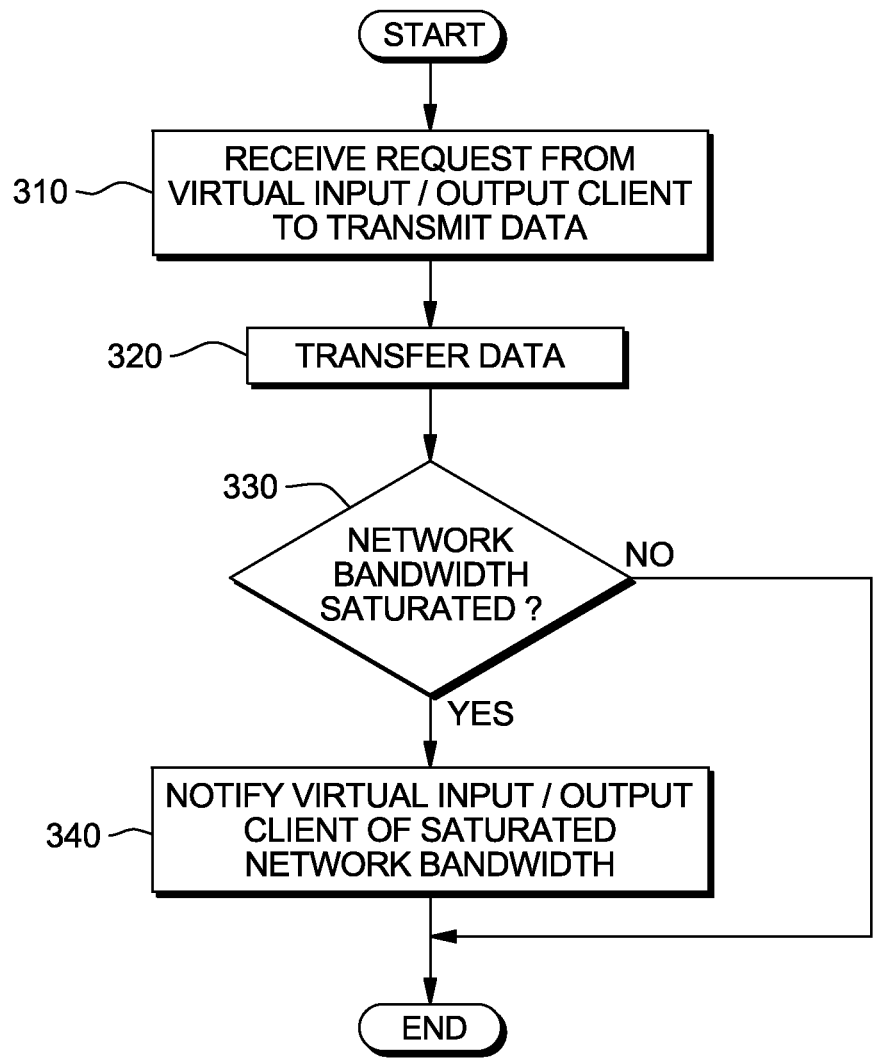
FIG. 3 illustrates a flow chart of a hypervisor program for regulating network bandwidth in a virtualized computer environment, according to one embodiment of the present invention.

FIG. 3 illustrates a flow chart of a hypervisor program for regulating network bandwidth in a virtualized computer environment, according to one embodiment of the present invention. In step 310, hypervisor program 212 receives a request from VIOC 204c to transmit a packet to external network 220 via VIOS 204d. In step 320, hypervisor 212 transfers the packet from memory of VIOC 204c to memory of VIOS 204d. RDMA program 218 maps the memory of VIOC 204c, as well as the memories of VIOC 204a and VIOC 204b, to the memory of VIOS 204d. In response to step 320, bandwidth regulating program 224 determines, and reports to hypervisor program 212, if network bandwidth is saturated, at step 330. If hypervisor program 212 receives an error message from notification input program function 226 after hypervisor program 212 copies the packet from VIOC 204c to VIOS 204d, indicating that network bandwidth is saturated (decision 330, yes branch), client notification program function 228 notifies VIOC 204c, at step 340, of the saturated network bandwidth. However, if hypervisor program 212 does not receive an error message from notification input program function 226, because network bandwidth is not saturated, then client notification program function 228 does not notify VIOC 204c of any bandwidth constraint.

Figure 4:
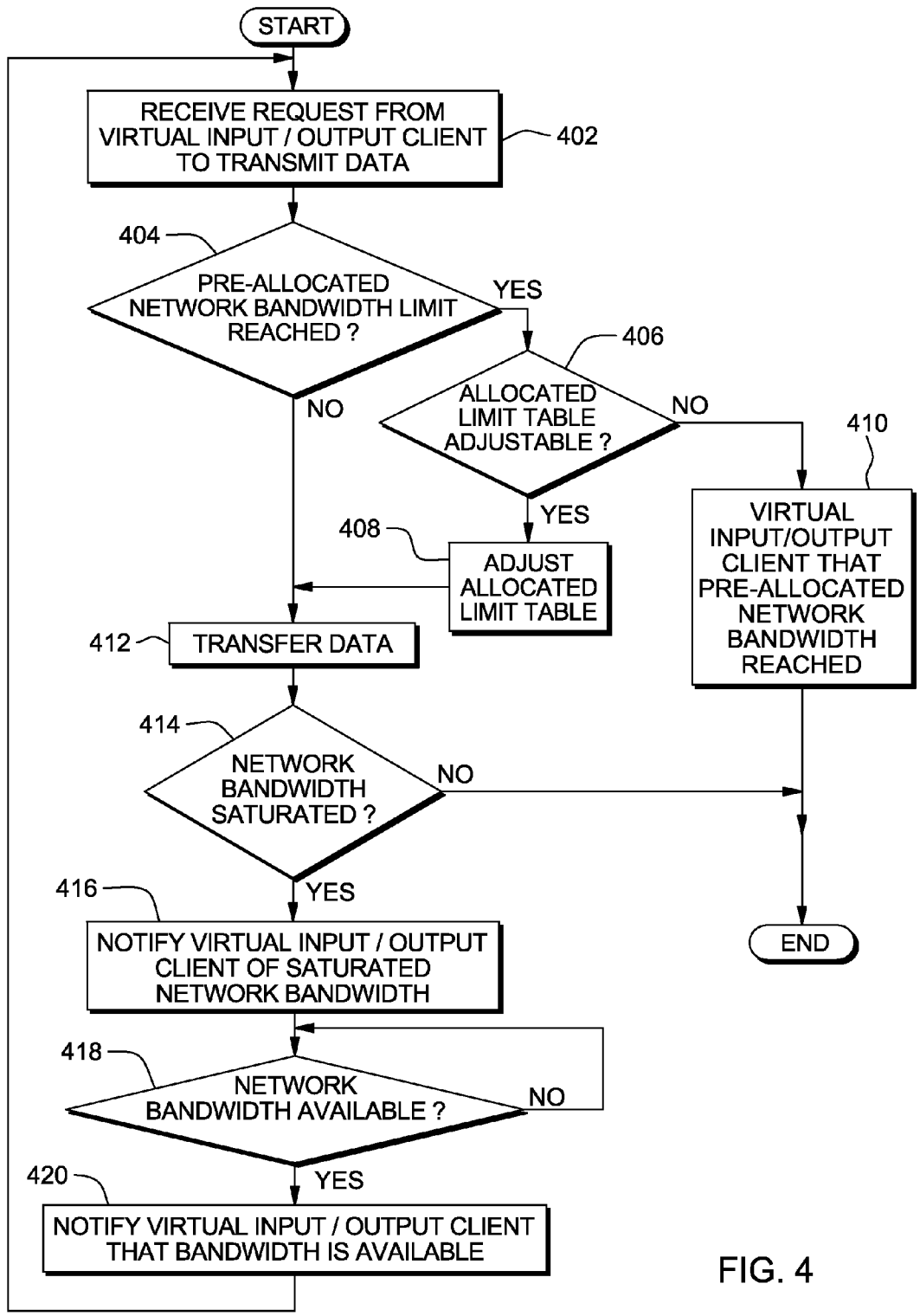
FIG. 4 illustrates a flow chart of a hypervisor program for regulating network bandwidth in a virtualized computer environment, according to another embodiment of the present invention.

FIG. 4 illustrates in more detail the function of hypervisor program 212 including bandwidth regulating program 224, notification input program function 226, client notification program function 228, and allocated limit program function 230 within computer 216 to regulate network bandwidth in a virtualized computer environment, according to another embodiment of the present invention. At step 402, hypervisor 212 receives a request from VIOC 204c to transmit a packet to external network 220 via VIOS 204d. Allocated limit program function 230 determines, at step 404, whether a pre-allocated bandwidth limit will be exceeded by the sending VIOC 204c if the sending VIOC 204c transmits the packet to external network 220 via VIOS 204d. The determination is based on the current bandwidth utilization of VIOC 204c and the projected additional bandwidth required to transmit the packet. For example, allocated limit program function 230 compares an aggregate of the current bandwidth utilization by VIOC 204c and the bandwidth utilization required to transmit the packet with a bandwidth limit pre-allocated for VIOC 204c in bandwidth allocation table 232 maintained by hypervisor program 212.

If allocated limit program function 230 determines that the pre-allocated bandwidth limit for VIOC 204c will be exceeded by transmitting the packet (decision 404, yes branch), allocated limit program function 230 determines whether bandwidth allocation table 232 can be adjusted to accommodate the received request (decision 406). For example, a portion of network bandwidth may be currently allocated to VIOC 204b. If VIOC 204b is idle, allocated limit program function 230 determines the portion of network bandwidth allocated to VIOC 204b can be reduced and the network bandwidth allocated to VIOC 204c can be increased by the same portion. If hypervisor program 212 later receives a request to transmit a packet from VIOC 204b, allocated limit program function 230 can re-adjust the network bandwidth allocations.

If allocated limit program function 230 determines that allocation table 232 can be adjusted (decision 406, yes branch), allocated limit program function 230 adjusts allocation table 232 to accommodate the request to transmit the packet from VIOC 204c, at step 408. Otherwise, client notification program function 228 returns an error message notifying the sending VIOC 204c that VIOC 204c has reached its allocated bandwidth limit and that the packet was dropped, step 410.

Hypervisor program 212 copies the packet from a mapped memory of VIOC 204c to a mapped memory of VIOS 204d, at step 412, after allocated limit program function 230 determines, at step 404, that pre-allocated bandwidth limit for VIOC 204c has not yet been reached, or after allocated limit program function 230 makes appropriate adjustments to allocation table 232, at step 408. After copying the data from a mapped memory of VIOC 204c to a mapped memory of VIOS 204d at step 412, notification input program function 226 determines, at step 414, whether an error message indicating saturated network bandwidth has been received from SEA 208. If notification input program function 226 receives an error message from SEA 208 indicating saturated network bandwidth at step 412, client notification program function 228 notifies the sending VIOC 204c of the saturated bandwidth, at step 416.

At step 418, notification input program function 226 continues to monitor for incoming messages indicating network bandwidth availability. When notification input program function 226 determines, at step 418, that network bandwidth becomes available, client notification program function 228 notifies sending VIOC 204c at step 420 of the available bandwidth.

Figure 5:
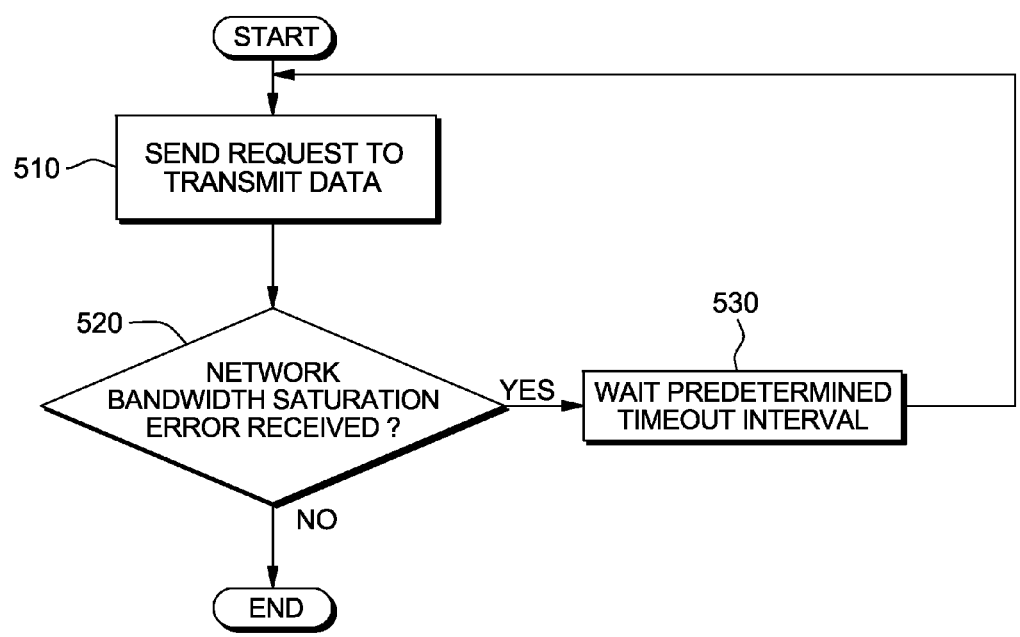
FIG. 5 illustrates a flow chart of a virtual input/output client program, according to an embodiment of the present invention.

FIG. 5 illustrates a flow chart of an input/output client program of a virtual input/output client (VIOC), according to an embodiment of the present invention. At step 510, input/output client program of VIOC 204c sends a request to transmit a packet If, at step 520, input/output client program of VIOC 204c receives a network bandwidth saturated error from client notification program function 228, VIOC 204c then waits a predetermined timeout interval, at step 530, before attempting to again send the request to transmit data at step 510.

Figure 6:
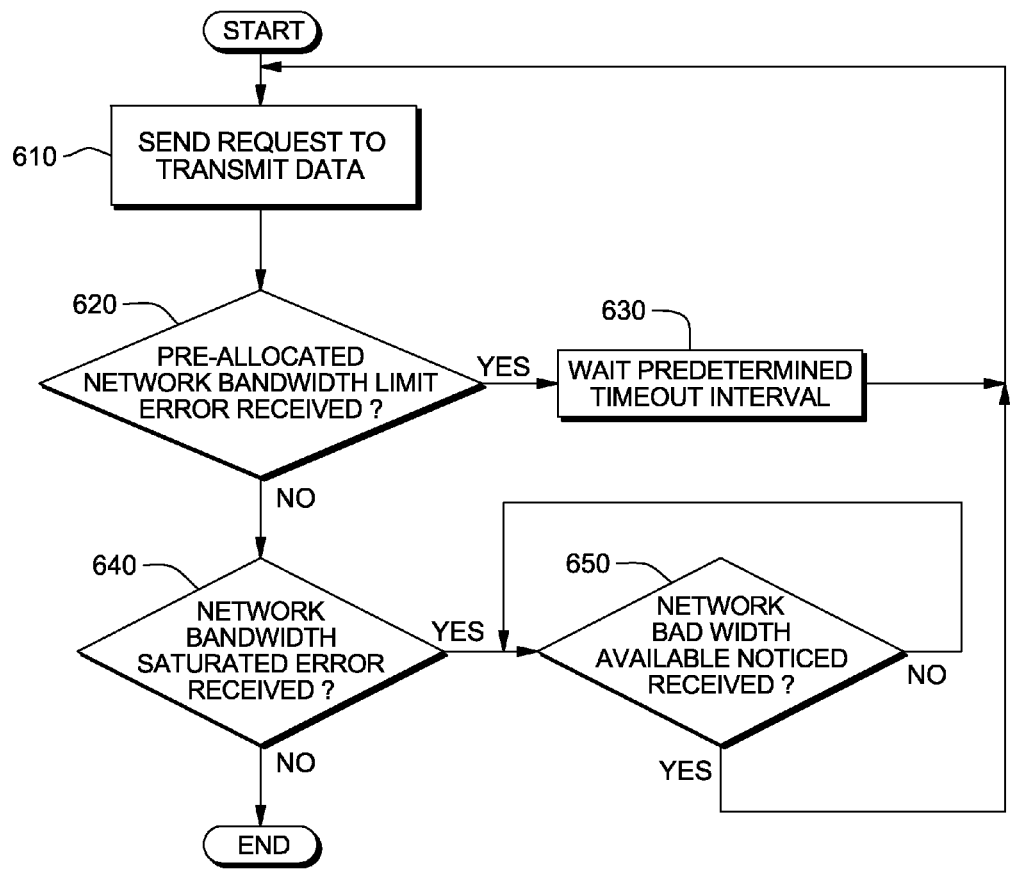
FIG. 6 illustrates a flow chart of a virtual input/output client program, according to another embodiment of the present invention.

FIG. 6 illustrates a flow chart of an input/output client program of a virtual input/output client (VIOC), according to another embodiment of the present invention. At step 610, input/output client program of VIOC 204c sends a request to transmit a packet. If, at step 620, input/output client program of VIOC 204c receives an error from client notification program function 228 indicating pre-allocated network bandwidth has been reached, input/output client program of VIOC 204c then waits a predetermined timeout interval, at step 630, before attempting to again send the request to transmit the packet. If, at step 640, input/output client program of VIOC 204c receives a network bandwidth saturated error from client notification program function 228, input/output client program of VIOC 204c then waits, at step 650, to receive a notice from client notification program function 228 indicating that network bandwidth has become available. When input/output client program of VIOC 204c receives notice, at step 650, that network bandwidth has become available, input/output client program of VIOC 204c then attempts to again send the request to transmit the packet at step 610.

Figure 7:
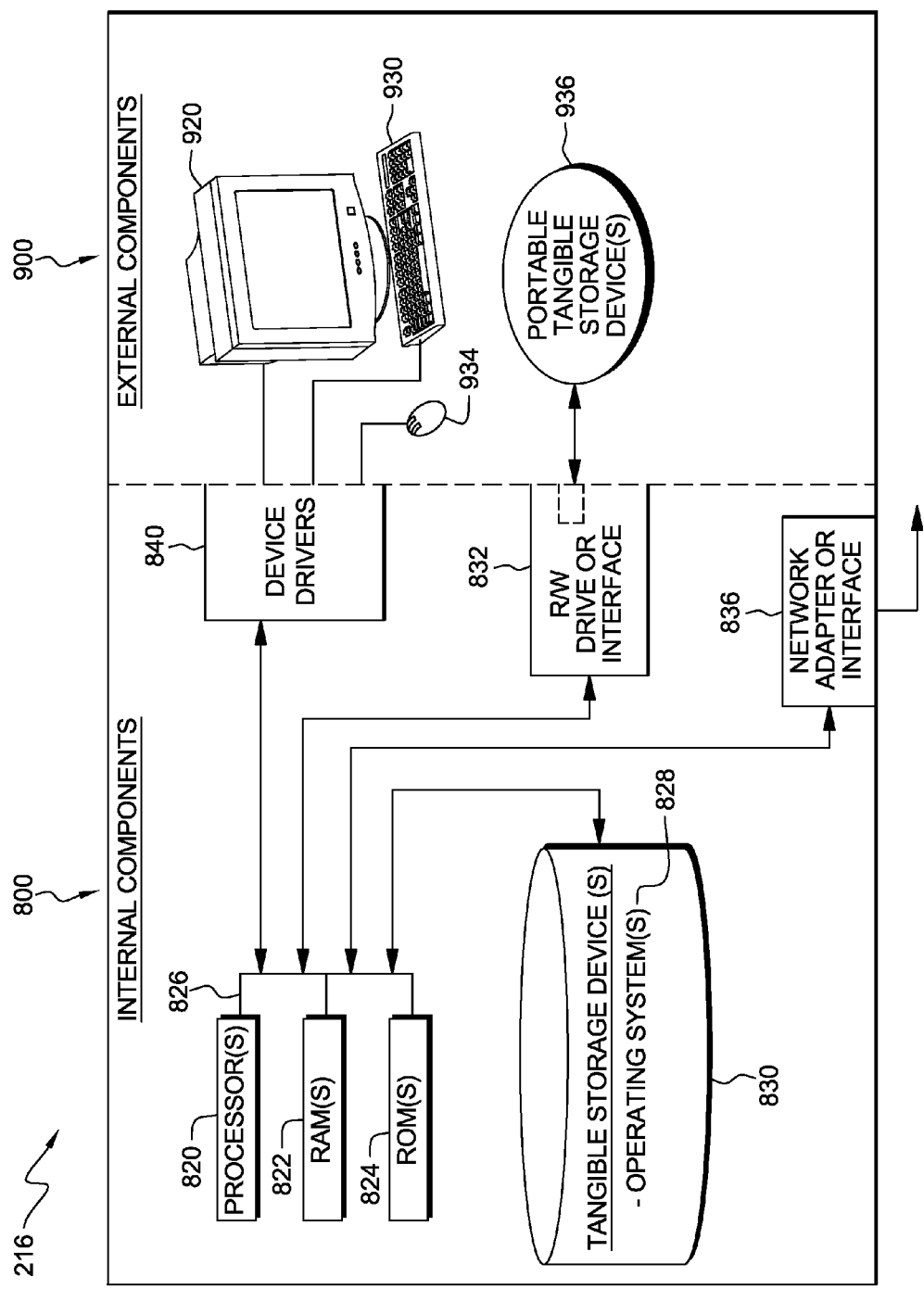
FIG. 7 illustrates internal and external real components of the computer of FIG. 2.

FIG. 7 illustrates hardware and software components of computer 216 of FIG. 2. Computer 216 includes internal components 800 and external components 900. Internal components 800 include one or more processors 820, one or more computer-readable RAMs 822 and one or more computer-readable ROMs 824 on one or more buses 826, and one or more guest operating systems 828 and one or more computer-readable tangible storage devices 830. The guest operating systems 828 execute in respective virtual clients and virtual servers to control execution of applications in the respective virtual clients and virtual servers, and are separate from hypervisor program 212. The one or more operating systems 828, hypervisor program 212, bandwidth regulating program 224, notification input program function 226, client notification program function 228, and allocated limit program function 230 are stored on one or more of the computer-readable tangible storage devices 830 for execution by one or more of the processors 820 via one or more of the RAMs 822 (which typically include cache memory). Bandwidth allocation table 232 is also stored on one or more computer-readable tangible storage devices 830. In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information. The term "computer-readable tangible storage device" does not encompass signal propagation media such as a copper cable, optical fiber or wireless transmission media.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. The hypervisor program 212, bandwidth regulating program 224, notification input program function 226, client notification program function 228, and allocated limit program function 230, can be stored on one or more of the portable computer-readable tangible storage devices 936, read via R/W drive or interface 832 and loaded into one or more computer-readable tangible storage devices 830.

Internal components 800 also include a network adapter or interface 836 such as a TCP/IP adapter card. The hypervisor program 212, bandwidth regulating program 224, notification input program function 226, client notification program function 228, and allocated limit program function 230 can be downloaded to computer 216 from an external computer via a network (for example, the Internet, a local area network or other, wide area network) and network adapter or interface 836. From the network adapter or interface 836, the hypervisor program 212, bandwidth regulating program 224, notification input program function 226, client notification program function 228, and allocated limit program function 230 are loaded into one or more computer-readable tangible storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. Internal components 800 also include device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Hypervisor program 212, bandwidth regulating program 224, notification input program function 226, client notification program function 228, and allocated limit program function 230 can be written in various programming languages including low-level, high-level, object-oriented or non object-oriented languages. Alternatively, the functions of hypervisor program 212, bandwidth regulating program 224, notification input program function 226, client notification program function 228, and allocated limit program function 230 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for regulating network bandwidth in a virtualized computer environment, the method comprising the steps of:
   a computer comprising a hypervisor program receiving a request from a first virtual client to transmit data, and in response, the computer copying the data from a memory of the first virtual client to a memory of a virtual server;
   the computer receiving an error notification from a shared virtual network adapter in communication with the virtual server and a physical network adapter, the error indicative of insufficient network bandwidth available to transmit the data, and in response, the computer notifying the first virtual client that insufficient network bandwidth is available to transmit the data; and
   prior to the step of copying the data from the memory of the first virtual client to the memory of the virtual server, the computer determining that a first pre-allocated bandwidth limit for the first virtual client has been reached, and in response, the computer determining that bandwidth currently allocated to a second virtual client within the virtualized computer environment is not currently being used, and in response, the computer increasing the first pre-allocated bandwidth limit to a first adjusted bandwidth limit.

2. The method of claim 1, further comprising the steps of:
the computer receiving a bandwidth available notification from the shared virtual network adapter of the virtual server, the bandwidth available notification indicative of increased network bandwidth being available, and in response, the computer notifying the first virtual client that sufficient network bandwidth is available to transmit the data.

3. The method of claim 1, wherein the step of the computer determining that the first pre-allocated bandwidth limit for the first virtual client has been reached comprises determining that an aggregate of a current bandwidth utilization by the first virtual client and a bandwidth utilization required to transmit the data is greater than a bandwidth limit pre-defined for the first virtual client in a bandwidth allocation table.

4. The method of claim 1, further comprising the step of:
in response to the step of determining that bandwidth currently allocated to the second virtual client within the virtualized computer environment is not currently being used, the computer decreasing a second pre-allocated bandwidth limit of the second virtual client to a second adjusted bandwidth limit.

5. The method of claim 4, further comprising the steps of:
the computer receiving a request from the second virtual client to transmit data, and in response, the computer reducing the first adjusted bandwidth limit to the first pre-allocated bandwidth limit and the computer increasing the second adjusted bandwidth limit to the second pre-allocated bandwidth limit.

6. A computer program product for regulating network bandwidth in a virtualized computer environment, the computer program product comprising:
one or more computer-readable tangible hardware storage devices and program instructions stored on at least one of the one or more hardware storage devices, the stored program instructions comprising:
program instructions to receive a request to transmit data from a first virtual client to a virtual server;
program instructions to copy the data from a memory of the first virtual client to a memory of a virtual server;
program instructions to receive a bandwidth utilization error notification from a shared virtual network adapter in communication with the virtual server and a physical network adapter, and in response, to notify the first virtual client of insufficient network bandwidth; and
program instructions to, prior to copying the data from the memory of the first virtual client to the memory of the virtual server, determine that a first pre-allocated bandwidth limit for the first virtual client has been reached, and in response, to determine that bandwidth currently allocated to a second virtual client within the virtualized computer environment is not currently being used, and in response, to increase the first pre-allocated bandwidth limit to a first adjusted bandwidth limit.

7. The computer program product of claim 6 wherein the stored program instructions further comprise program instructions to receive a bandwidth available notification from the shared virtual network adapter of the virtual server, the bandwidth available notification indicative of increased network bandwidth being available, and in response, to notify the first virtual client that sufficient network bandwidth is available to transmit the data.

8. The computer program product of claim 6, wherein the program instructions to determine that the first pre-allocated bandwidth limit for the first virtual client has been reached comprise program instructions to determine that an aggregate of a current bandwidth utilization by the first virtual client and a bandwidth utilization required to transmit the data is greater than a bandwidth limit pre-defined for the first virtual client in a bandwidth allocation table.

9. The computer program product of claim 6, wherein the stored program instructions further comprise program instructions to decrease a second pre-allocated bandwidth limit for the second virtual client to a second adjusted bandwidth limit.

10. The computer program product of claim 9 wherein the stored program instructions further comprise:
program instructions to receive a request to transmit data from the second virtual client to the virtual server;
program instructions to reduce the first adjusted bandwidth limit to the first pre-allocated bandwidth limit; and
program instructions to increase the second adjusted bandwidth limit to the second pre-allocated bandwidth limit.

11. A computer system for regulating network bandwidth in a virtualized computer environment, the computer system comprising:
one or more processors, one or more computer-readable tangible hardware storage devices, and program instructions stored on at least one of the one or more hardware storage devices for execution by at least one of the one or more processors, the stored program instructions comprising:
program instructions to receive a request to transmit data from a first virtual client to a virtual server;
program instructions to copy the data from a memory of the first virtual client to a memory of a virtual server;
program instructions to receive a bandwidth utilization error notification from a shared virtual network adapter in communication with the virtual server and a physical network adapter, and in response, to notify the first virtual client of insufficient network bandwidth; and
program instructions to, prior to copying the data from the memory of the first virtual client to the memory of the virtual server, determine that a first pre-allocated bandwidth limit for the first virtual client has been reached, and in response, to determine that bandwidth currently allocated to a second virtual client within the virtualized computer environment is not currently being used, and in response, to increase the first pre-allocated bandwidth limit to a first adjusted bandwidth limit.

12. The computer system of claim 11, wherein the stored program instructions further comprise program instructions to receive a bandwidth available notification from the shared virtual network adapter of the virtual server, the bandwidth available notification indicative of increased bandwidth being available, and in response, to notify the first virtual client that sufficient network bandwidth is available to transmit the data.

13. The computer system of claim 11, wherein the stored program instructions further comprise:
program instructions to determine that bandwidth currently allocated to the second virtual client is currently being used; and
program instructions notify the first virtual client that the first pre-allocated bandwidth limit has been reached.

14. The computer system of claim 11, wherein the program instructions to determine that the first pre-allocated bandwidth limit has been reached comprise program instructions to determine that an aggregate of a current bandwidth utilization by the first virtual client and a bandwidth utilization required to transmit the data is greater than a bandwidth limit pre-defined for the first virtual client in a bandwidth allocation table.

15. The computer system of claim 11, wherein the stored program instructions further comprise program instructions to decrease a second pre-allocated bandwidth limit for the second virtual client to a second adjusted bandwidth limit.

16. The computer system of claim 15, wherein the stored program instructions further comprise:
program instructions to receive a request to transmit data from the second virtual client to the virtual server;
program instructions to reduce the first adjusted bandwidth limit to the first pre-allocated bandwidth limit; and
program instructions to increase the second adjusted bandwidth limit to the second pre-allocated bandwidth limit.

* * * * *